Patented Nov. 2, 1948

2,452,616

UNITED STATES PATENT OFFICE 2,452,616

ZIRCONIUM LAKES AND METHOD OF MAKING SAME

Eugene Wainer, Niagara Falls, N. Y., and Henry L. Van Mater, Highland Park, N. J., assignors to The Titanium Alloy Manufacturing Company, Niagara Falls, N. Y.

No Drawing. Application April 6, 1944, Serial No. 529,820

15 Claims. (Cl. 106—289)

The present invention relates to the preparation of colored lakes and more particularly to lakes formed by the precipitation of a dye containing a sulphonic acid radical upon a base containing zirconium by the employment of a zirconium compound as the precipitation medium.

The sulphonic acid derivatives of coal tar, aniline and similar compounds comprise a group of dyes that are highly colored and widely used. In general the sodium salt or derivative is water soluble and these complex compounds are generally handled in commerce as such derivative. Although for purposes of application the dye should be water soluble, for purposes of use the dye should be made as completely insoluble as possible and thereby changed to a "non-bleeding condition." As the sulphonic acid type dyes are usually quite expensive, costs being measured in dollars per pound, a fairly standard procedure in employing these dyes is to precipitate them upon a suitable base so that dilution of the expensive dye compound is afforded. At the same time insolubility of the dye, brilliance thereof and color are maintained. The type of complex thus formed by precipitation of the dye upon a base is termed a "lake." These lakes are employed as color agents for inks, paints, lithographing colors, foods, drugs, cosmetics, fabrics, resins, rubber, tile and concrete, leather finishes and in a wide variety of applications requiring color.

Lakes have been employed extensively heretofore and have been produced by a relatively standard procedure wherein the dye has been precipitated upon alumina by means of a compound of aluminum. Although these lakes have been employed extensively, it has been recognized that the alumina systems possess certain disadvantages as follows:

1. Relatively low precipitating power for dye.
2. Transparency.
3. Tendency of the dye to bleed in aqueous and organic media.
4. Reactivity of alumina compounds in organic media such as resins, varnishes, rubber, etc., particularly at elevated temperatures; and,
5. Development of hardness at temperatures above 160° F.

The present invention is designed to provide colored lakes wherein the recited disadvantages are eliminated.

By the employment of certain types of compounds of zirconium both as the precipitating agent and as the base for preparation of the lake, extremely brilliant colors are obtained which are non-bleeding in water, castor oil, resins, and other materials. Such lakes are highly opaque and are stable in the general conditions of heat and light encountered by products colored with organic colors. Furthermore, the lakes and their bases of the present invention are insoluble in dilute acids and hence may be used in varnishes without the probability of "livering" so prone to occur with lakes made of the more readily soluble aluminous materials. A further advantage resides in lakes made of the specified compounds of zirconium since their relative non-reactivity eliminates undesired side reactions with solvents in contact with them.

A most important feature of the present invention is the universality of the procedures for precipitating water soluble compounds containing the sulphonic acid radical as the preparation of lakes with zirconium compounds appears to be generally applicable at high efficiency. This is in contrast with the poor efficiency of precipitation of some sulphonic acid type dyes by aluminum salts thus making preparation of lakes of these compounds commercially impractical by the employment of alumina.

Many alumina lakes bleed on drying, whereas drying accentuates the non-bleeding character of lakes made with zirconia or zirconium compounds as a base. Furthermore, by operating in accordance with the present invention, drying may be carried out at temperatures of 40° to 80° F. higher than is possible with alumina systems without destruction of the softness of the product.

It has been found in accordance with the present invention that a general chemical property of a zirconyl ion is its ability to form complexes insoluble in water and dilute acid with compounds containing either the sulphonate or sulphonic acid radical. The completeness of precipitation depends in part on the pH, the ratio of $ZrO_2$ to the fixed alkalies present, and the nature of the sulphate or sulphonate linkages in the complex. For example, if the chemical being precipitated contains organic groups which cannot be split from the sulphonic acid group, the organic compound is precipitated as a complex zirconium compound. Invariably adsorptive phenomena are a further aid in precipitation of the organic compound.

Generally, the novel lake system of the present invention consists of the following parts: the dye solution, a hydrous water insoluble or partially soluble compound of zirconium, a water soluble salt of zirconium. The hydrous water insoluble or partially soluble compound of zirconium may consist of one or more compounds of zirconia, a portion of which may consist of zirconium hydroxide preferably precipitated by ammonia, the remainder consisting of various other types of hydrous zirconia precipitates. The zirconium hydroxide serves not only as a base for precipitation but is a distinct aid in fixing the dye. The precipitation base may be extended with such materials as talc, barium, sulphate, etc., as heretofore. In addition to the general ingredients listed above, a small amount of sodium soap such as sodium stearate or stearic acid emulsified with triethanolamine may be added to the system. This is an aid in obtaining brilliance and in leveling the color. When the sodium stearate is omitted the color deposition in some cases tends to be streaky and somewhat dull.

We have found that a general reaction of zirconia salts is their "striking" or precipitating action on sulphonic acid type compounds such as dyes. Of these, we have found zirconium oxychloride to be the most efficient and most generally useful. The dye is precipitated with less $ZrO^{++}$ using the oxychloride than with any other compound.

The substrata or bases are of two general types, those which are inert from a precipitation of dye standpoint and those which contribute to the retention of the dye and aid in the development of non-bleeding. Examples of the first class which are useful for the purposes of our invention are talc or soapstone, barium sulphate, and like materials. The second class which we have developed for purposes of our invention are hydrous compounds of zirconia which are insoluble in water. Suitable hydrous compounds of zirconia are ammonia precipitated zirconium hydroxide, caustic precipitated zirconium hydroxide, zirconium carbonate, zirconium phosphate, organic compounds such as the mono fatty acid derivatives of zirconium, viz. the stearate, etc., basic zirconium sulphates of the water insoluble type such as $2ZrOSO_4.ZrO(OH)_2$,

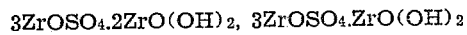

$3ZrOSO_4.2ZrO(OH)_2$, $3ZrOSO_4.ZrO(OH)_2$ and similar basic compounds of the oxy and hydroxy type.

An important class of bases are the zirconium derivatives of polybasic organic acids and aromatic compounds. Examples of these last two groups are basic zirconyl dioctylsulfosuccinates, basic zirconyl naphthenate, etc. Generally speaking colorless organic acids or compounds containing sulphonic acid groups may be used as lake bases by precipitation of the corresponding zirconium derivative, this zirconium derivative serving as the substrate for precipitation of the lake by a soluble zirconium salt.

These hydrous zirconia materials yield a wide variety of properties in the finished article when used alone. It is a further feature of our invention that these hydrous bases of zirconium may be combined into a complex system which may be so constituted as to utilize the good points of the ingredients and also eliminate or mask any bad points. For example, the most efficient base from a precipitation standpoint is zirconium hydroxide precipitated by the addition of ammonia to zirconium oxychloride. Where drying of a lake whose base consists entirely of such hydroxide yields a hard, horny product with poor covering power due to the difficulty of grinding to fine size, the characteristic may be improved by addition of zirconium phosphate which yields an extremely soft, fluffy product. Combination of the hydroxide and the phosphate yields a base having the high efficiency of precipitation of the hydroxide coupled with the soft, fluffy nature of the dried phosphate, the system being one of complete utility. Zirconium monostearate is a relatively efficient base but the dried product has a tendency to ball. An advantage of the stearate is its stability in castor oil. Combinations of the stearate, phosphate and hydroxide retains the stability of the stearate in castor oil, the retentivity of the hydroxide for non-bleeding in water while the phosphates eliminate the balling of the stearate and the harshness of the dried hydroxide. All manner of combinations of the hydrous bases can thus be used.

Invariably, the bases used are prepared separately and thoroughly washed prior to use. Excessive amounts of soluble ions in the bases lower efficiency of retention. Our general method of preparation of our novel lakes is as follows: The thoroughly washed hydroxide and other hydrous precipitates are dispersed in a minimum amount of water. Auxiliary extenders such as talc, barium sulphate, and the like materials, are incorporated at this point. The dye is then added in amounts required to yield the desired loading. The pH of the system is brought to 7 to 7.5 with alkali, such as $NH_4OH$ or $CaCO_3$, and a solution of soap or stearic acid emulsified with triethanolamine then added. Zirconium oxychloride is then added in small increments in amount finally sufficient to precipitate the dye completely. The system is digested cold or hot and after filtration and thorough washing is dried at 100 to 105° C.

Dispersion of the hydrous precipitates for use as substrata may be effected in any desirable fashion although a useful procedure is ball milling. The filter cakes are used directly for this purpose without drying. The dye is added as the dry powder or in solution. Neutralization of the system before the soap addition is necessary to prevent localized precipitation of the soap. The oxychloride is added either as a crystal or as a concentrated solution. The oxychloride is preferably added in small increments. An increase in efficiency of precipitation is afforded by adding with the oxychloride an amount of $CaCO_3$ approximately ¼ to ⅛ that of the weight of oxychloride. On this basis a pH range of 3 to 5 is obtained which is optimum for maximum precipitation of the dye. After the dye is completely precipitated the pH is adjusted to this range with $CaCO_3$. The pH may be obtained by dilution if desired. The soap solution not only increases brilliance but also reduces the amount of oxychloride required.

Having described our invention the following examples will illustrate our method of practice and are not to be limitative of the invention:

*Example 1*

Hydrous zirconium phosphate is prepared by precipitation from solution by reaction of zirconium oxychloride and phosphoric acid. Zirconium hydroxide or hydrate is prepared by precipitation from solution by reaction of zirconium oxychloride and ammonium hydroxide. Both precipitates are thoroughly washed until free of chlorides and blown dry in the filter press. A batch consisting of 300 grams of the phosphate and 300 grams of the hydrate is ball milled for 10 to 20 minutes with 600 cc. of water. After discharging the slip into a suitable vessel, the pH is brought to 7 to 7.5 by the addition of about 10 cc. of $NH_4OH$. 20 grams of the sulphonic acid type dye is then added to the slip as a 5% solution in water, and the reactants thoroughly stirred. 25 grams of sodium stearate is then added as a hot 15% solution in water. After stirring for a few minutes zirconium oxychloride is added as a 20% solution in water in 50 cc. increments. Approximately 300 cc. of this solution is required for complete precipitation equivalent to 60 grams of zirconium oxychloride. The batch is stirred for about one hour at 65 to 80° C. and then filtered and washed till free of chlorides. The product is dried at 100° C. Yield=200 grams equivalent to 10% dye content.

The amount of oxychloride required for complete precipitation of the dye will depend on the nature of the dye and the amount of impurities the dye contains. For most commercial types of dyes the amount of oxychloride required to precipitate 20 grams of the dye will vary between 35 and 100 grams of zirconium oxychloride.

*Example 2*

Same as Example 1 except the sodium stearate is replaced with 20 grams of stearic acid which has been emulsified with 7 cc. of triethanolamine. This emulsion is prepared by melting the 20 grams of stearic acid in 300 cc. of water, heating to 90 to 95° C., and then adding the triethanolamine slowly with vigorous stirring.

*Example 3*

200 grams of the phosphate filter cake and 200 grams of the ammonium type zirconium hydrate is mixed with 50 grams of zirconium monostearate. The batch is dispersed by ball milling with 600 cc. of water. The same procedure is then followed as in Example 1 except that the stearate addition therein listed is omitted and the pH is brought to 8 before addition of the dye. Freshly precipitated zirconyl monostearate may be used in place of the previously dried product.

In this case the monostearate may be prepared by either of the suggested following procedures:

142 grams of stearic acid and 53 grams of $Na_2CO_3$ are boiled together in 2 liters of water and the solution cooled to 50° C. One liter of a solution, containing 161 grams of $ZrOCl_2.8H_2O$ are added to one liter of a solution containing 161 grams of soda ash. The sodium stearate solution is then added to the zirconium solution with stirring and the whole heated to 65° C. with stirring. The pH of the solution is adjusted to 4 with HCl and the precipitate filtered and washed. Approximate yield of product on dry basis=200 grams.

A similar substratum may be prepared from ammonium stearate by substituting ammonium carbonate for sodium carbonate in the above procedure.

*Example 4*

Zirconium carbonate is prepared by adding zirconium oxychloride to a solution of ammonium carbonate to a pH of about 5. After filtering and washing free of chlorides 300 grams of the filter cake is combined with 300 grams of zirconium phosphate and the procedure as outlined in Example 1 repeated.

*Example 5*

Basic zirconium salts such as mixed zirconyl sulphate-zirconyl hydroxide are excellent substrata for precipitation of the dye. The general method of preparation of such substrates is to mix in solution $ZrO^{++}$ and $SO_4^{--}$ ions in the ratios indicated by the formulae given below. The compounds listed precipitate almost quantitatively by adjusting the pH to about 4 and heating to 65° C. These mixed sulfate-hydroxides are the following:

$$3ZrOSO_4.2ZrO(OH)_2$$
$$2ZrOSO_4.ZrO(OH)_2$$
$$3ZrOSO_4.ZrO(OH)_2$$

The precipitates are washed free of chlorides. When used as substrata alone, they are efficient and dry to a soft easily disintegrated powder. The material is handled as in Example 1.

*Example 6*

250 grams of washed filter cake consisting of hydrous $3ZrOSO_4.2ZrO(OH)_2$ is mixed with 50 grams of zirconium monostearate. This is mixed by milling with 500 cc. of water and 20 grams of dye added to the slurry. A 20% solution of $ZrOCl_2$ is added in 50 cc. increments, 2 grams of $CaCO_3$ being added with each 50 cc. addition. 300 cc. of the oxychloride are required. The precipitated batch is digested at 60 to 70° C. for about 1 hour and filtered. Yield after washing and drying at 100° C. is 206 grams equivalent to about 10% dye content.

*Example 7*

Basic zirconium naphthenate is prepared from commercial naphthenic acid using ammonium carbonate as described under the stearate preparation. An amount of washed precipitate equivalent to 45 grams of dried product is used. The precipitate is dispersed in 1 liter of water and 5.0 grams of dye added. The reactants were stirred and heated to 65° C. and 24.4 grams of zirconyl chloride dissolved in 500 cc. of water added. After digesting the precipitated lake was washed with 1% HCl and dried at 80 to 85° C. Yield equals 71.5 grams equivalent to 7% dye.

*Example 8*

Zirconyl derivatives of polybasic organic acids and their derivatives provide excellent substrata materials. These are sufficiently well hydrated so that they can be used alone in the same fashion as the oxysulphatehydrate precipitates. An example of such a base is basic zirconyl dioctylsulfosuccinate. This is prepared by dissolving 22.2 grams of dioctylsodium-sulfosuccinate in 1 liter of water. 32.2 grams of $Na_2CO_3$ is dissolved in water and added thereto a solution of 500 cc. containing 32.2 grams of zirconyl chloride. The zirconium solution and the succinate are mixed and heated to 65° C. A pH of 4 is obtained by addition of HCl. The precipitate is filtered and washed and is then ready for use.

While the amount of dye indicated in the examples is equal to a loading of 7 to 10%, dye loadings from a fraction of a percent up to 30 to 35% can be obtained by the same procedures. The only requirement is increase or decrease in amount of zirconium chloride used for precipitation of the dye.

In accordance with the present invention many compounds of zirconium may be successfully employed as substrata upon which dyes may be precipitated to form lakes. These compounds which are freshly precipitated from aqueous solutions are hydroxides, salts of inorganic acids, salts of organic acids, basic compounds and the like; if any of such compounds contain water of crystallization, they are suitable for use only when freshly precipitated as in such condition they contain adsorbed or hydrous water in addition to water of crystallization. For purposes of the claims these are all classed as "a hydrous compound of zirconium."

Although several zirconium salts of organic acids have been indicated as applicable for substrata of the type described, these are illustrative only of the principles of the invention as insoluble zirconium compounds are generally applicable. It will be understood that fatty acids other than stearic, such as oleic, palmitic and the like, provide excellent zirconium compounds for substrata.

Furthermore, soluble soaps may be employed in lieu of sodium stearate, as for instance, the soluble oleates and palmitates and other water soluble soaps as well as emulsions of the fatty acids as additions to aid in precipitating dye and in the production of lakes of special properties.

What is claimed is:

1. A color lake comprising a relatively water insoluble hydrous compound of zirconium as a lake substratum and a dye containing a sulfonic acid radical precipitated thereon comprising the reaction product of a water soluble zirconium salt and the dye.

2. A color lake comprising a relatively water insoluble hydrous basic compound of zirconium as a lake substratum and a dye containing a sulfonic acid radical precipitated thereon comprising the reaction product of a water soluble zirconium salt and the dye.

3. A color lake comprising a relatively water insoluble zirconium hydroxide as a lake substratum and a dye containing a sulphonic acid radical precipitated thereon comprising the reaction product of a water soluble zirconium salt and the dye.

4. A color lake comprising a relatively water insoluble hydrous zirconium phosphate as a lake substratum and a dye containing a sulphonic acid radical precipitated thereon comprising the reaction product of a water soluble zirconium salt and the dye.

5. A color lake comprising a relatively water insoluble hydrous basic zirconium sulphate as a lake substratum and a dye containing a sulphonic acid radical precipitated thereon comprising the reaction product of a water soluble zirconium salt and the dye.

6. A color lake comprising zirconium hydroxide and hydrous zirconium phosphate as a substratum and a dye containing a sulfonic acid radical precipitated thereon comprising the reaction product of a water soluble zirconium salt and a dye.

7. A color lake comprising zirconium hydroxide, hydrous zirconium stearate and zirconium phosphate as a lake substratum and a dye containing a sulfonic acid radical precipitated thereon comprising the reaction product of a water soluble zirconium salt and a dye.

8. A color lake comprising zirconium hydroxide, an insoluble zirconium salt of a higher fatty acid and hydrous zirconium phosphate as a lake substratum and a dye containing a sulfonic acid radical precipitated thereon comprising the reaction product of a water soluble zirconium salt and a dye.

9. A color lake comprising a relatively insoluble hydrous basic zirconium compound and a relatively insoluble zirconium salt of a higher fatty acid as a lake substratum and a dye containing a sulfonic acid radical precipitated thereon comprising the reaction product of a water soluble zirconium salt and a dye.

10. A color lake comprising a relatively insoluble hydrous basic zirconium compound and zirconium stearate as a lake substratum and a dye containing a sulfonic acid radical precipitated thereon comprising the reaction product of a water soluble zirconium salt and a dye.

11. A method for producing a color lake comprising mixing a relatively insoluble hydrous zirconium compound as a substratum and a solution containing a dye having a sulphonic acid radical therein and thereafter adding to the mixture sufficient of a water soluble zirconium salt to combine with and precipitate the dye upon the zirconium compound as a substratum.

12. A method for producing a color lake comprising mixing a relatively insoluble hydrous basic zirconium compound as a substratum and a solution containing a dye having a sulphonic acid radical therein and thereafter adjusting the pH to the neighborhood of 7 and adding sufficient of a water soluble zirconium salt to combine with and precipitate the dye upon the zirconium compound as a substratum.

13. A method for producing a color lake comprising mixing a relatively insoluble hydrous basic zirconium compound as a substratum and a solution containing a dye having a sulphonic acid radical therein and thereafter adjusting the pH of the mixture to the neighborhood of 7, adding a surface tension reducing agent to the mix and then a water soluble zirconium salt added in successive increments until the dye is precipitated from the solution upon the substratum as a zirconium compound of the dye.

14. A method for producing a color lake comprising mixing a relatively insoluble hydrous basic zirconium compound as a substratum and a solution containing a dye having a sulphonic acid radical therein and thereafter adjusting the pH of the mixture to the neighborhood of 7, adding a dispersion containing a higher fatty acid to the mix and then a water soluble zirconium salt in successive increments until the dye is precipitated from the solution upon the substratum as a zirconium compound of the dye.

15. A method for producing a color lake comprising mixing a relatively insoluble hydrous basic zirconium compound as a substratum and a solution containing a dye having a sulphonic acid radical therein and thereafter adjusting the pH of the mixture to the neighborhood of 7, adding a dispersion containing a fatty acid soap to the mix and then a water soluble zirconium salt in successive increments until the dye is precipitated from the solution upon the substratum as a zirconium compound of the dye.

EUGENE WAINER.
HENRY L. VAN MATER.

REFERENCES CITED

The following references are of record in the file of this patent:

UNITED STATES PATENTS

| Number | Name | Date |
|---|---|---|
| 558,197 | Muller-Jacobs | Apr. 14, 1896 |
| 1,343,446 | Goldschmidt | June 15, 1920 |
| 1,877,615 | Straub et al. | Sept. 13, 1932 |
| 2,099,690 | Holzach et al. | Nov. 23, 1937 |

FOREIGN PATENTS

| Number | Country | Date |
|---|---|---|
| 462,968 | Great Britain | Mar. 12, 1937 |
| 772,671 | France | Nov. 3, 1934 |

OTHER REFERENCES

"Treatise on Colour," Zerr & Rubencamp, 1908, pages 436–437.

"Zirconium," Department of Commerce, U. S. Bureau of Mines, June 1931, page 1.

Certificate of Correction

Patent No. 2,452,616.  November 2, 1948.

EUGENE WAINER ET AL.

It is hereby certified that errors appear in the printed specification of the above numbered patent requiring correction as follows:

Column 7, line 37, claim 6, before the syllable and hypen "substra-" insert the word *lake*; line 43, claim 7, strike out "hydrous" and insert the same before "zirconium" second occurrence;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*